Figure 12:
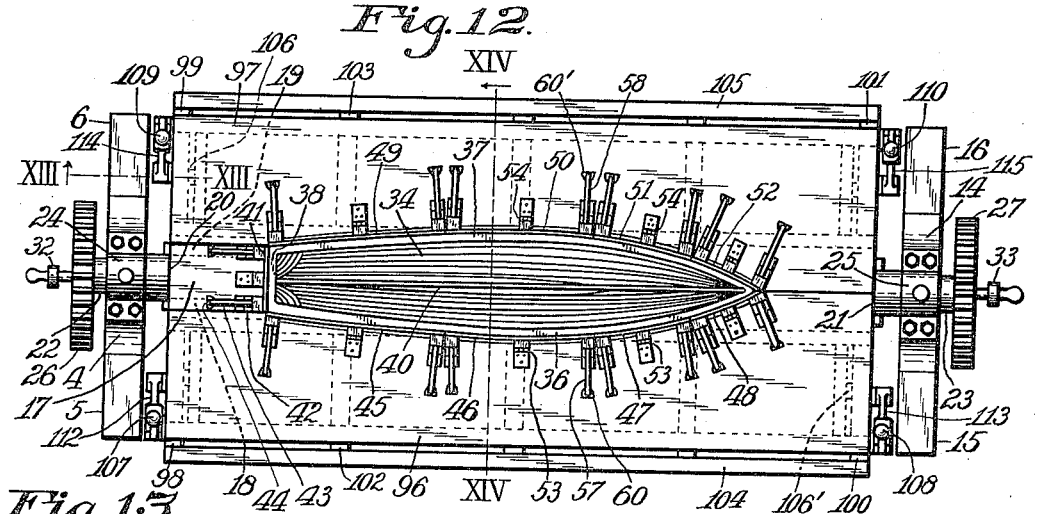

C. O. MORRIS.
MEANS FOR AND METHOD OF BUILDING CONCRETE BOATS.
APPLICATION FILED NOV. 14, 1918.
1,311,612.
Patented July 29, 1919.
4 SHEETS—SHEET 1.
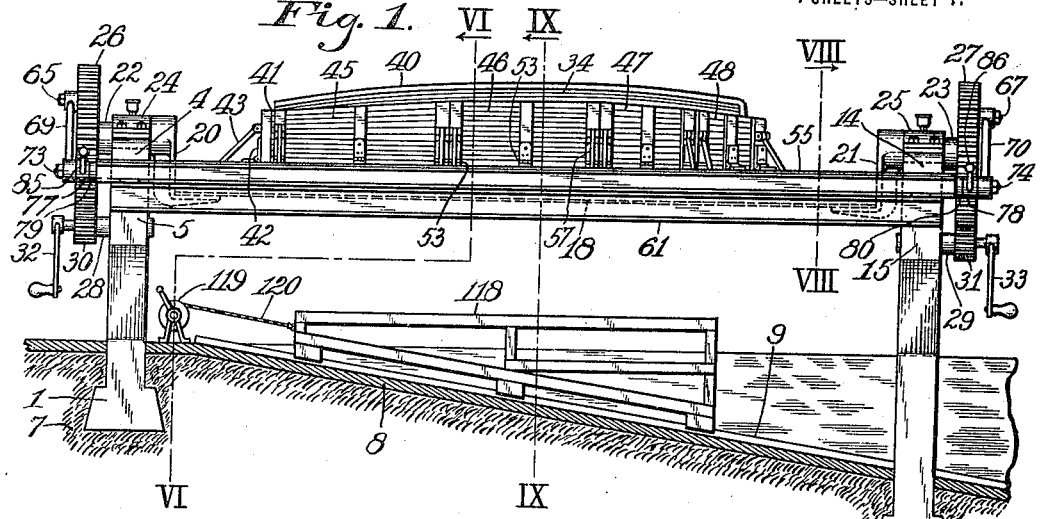
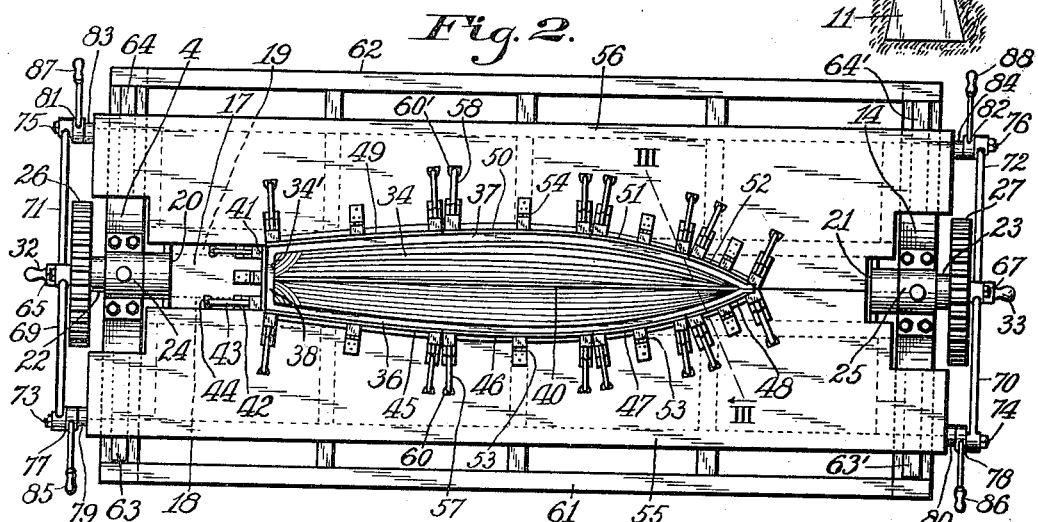
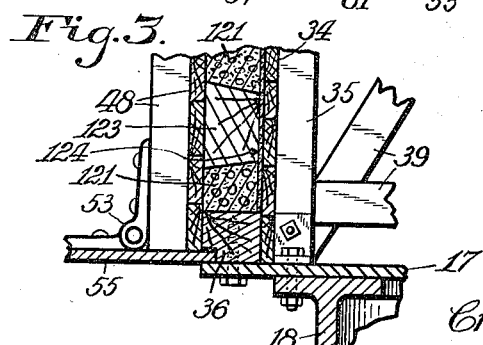
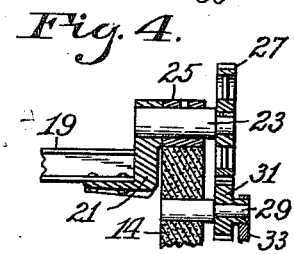
WITNESS:
O. L. Chamness
F. M. Roeder
INVENTOR:
Charles O. Morris,
BY
E. D. Silvius,
ATTORNEY.

C. O. MORRIS.
MEANS FOR AND METHOD OF BUILDING CONCRETE BOATS.
APPLICATION FILED NOV. 14, 1918.
1,311,612.
Patented July 29, 1919.
4 SHEETS—SHEET 2.
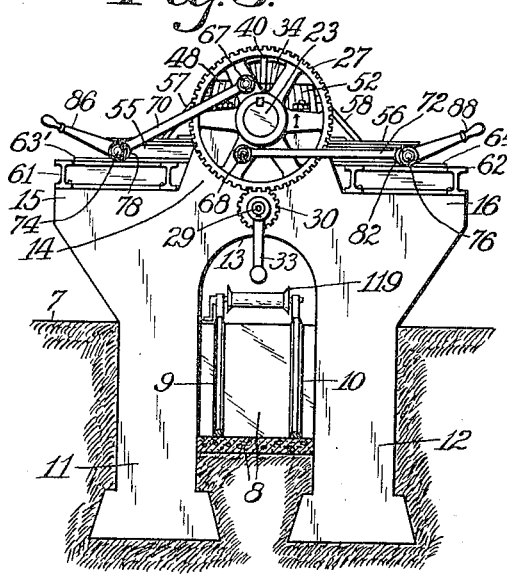
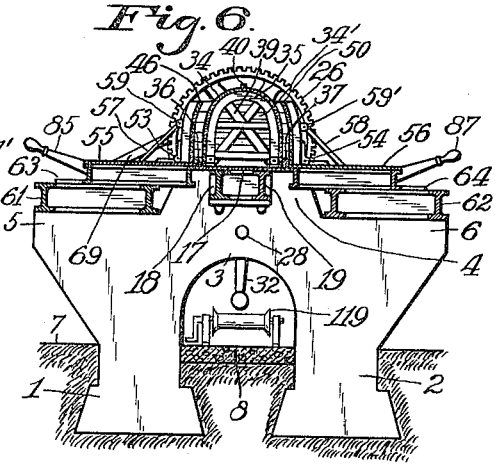
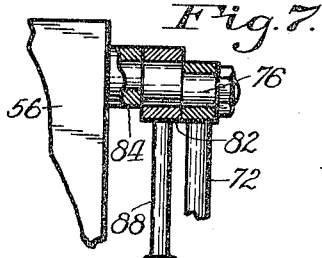
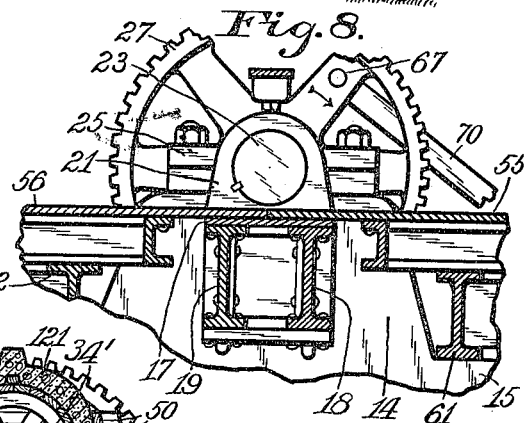
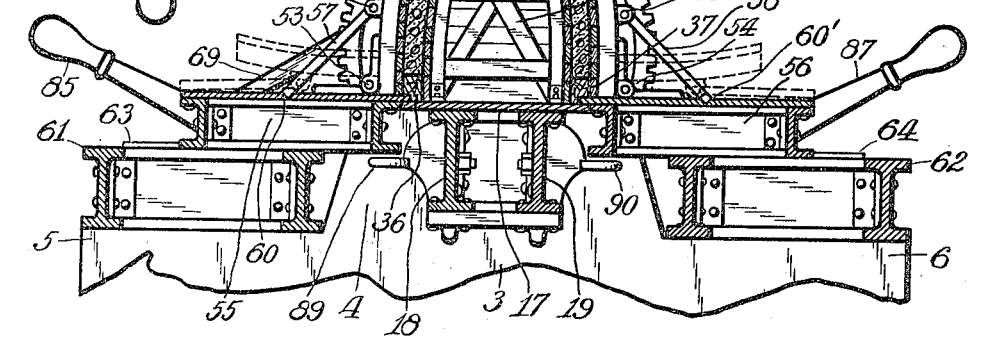
WITNESS:
O. L. Chamness
F. M. Roeder
INVENTOR:
Charles O. Morris,
BY
E. T. Silvius,
ATTORNEY.

C. O. MORRIS.
MEANS FOR AND METHOD OF BUILDING CONCRETE BOATS.
APPLICATION FILED NOV. 14, 1918.
1,311,612.
Patented July 29, 1919.
4 SHEETS—SHEET 3.
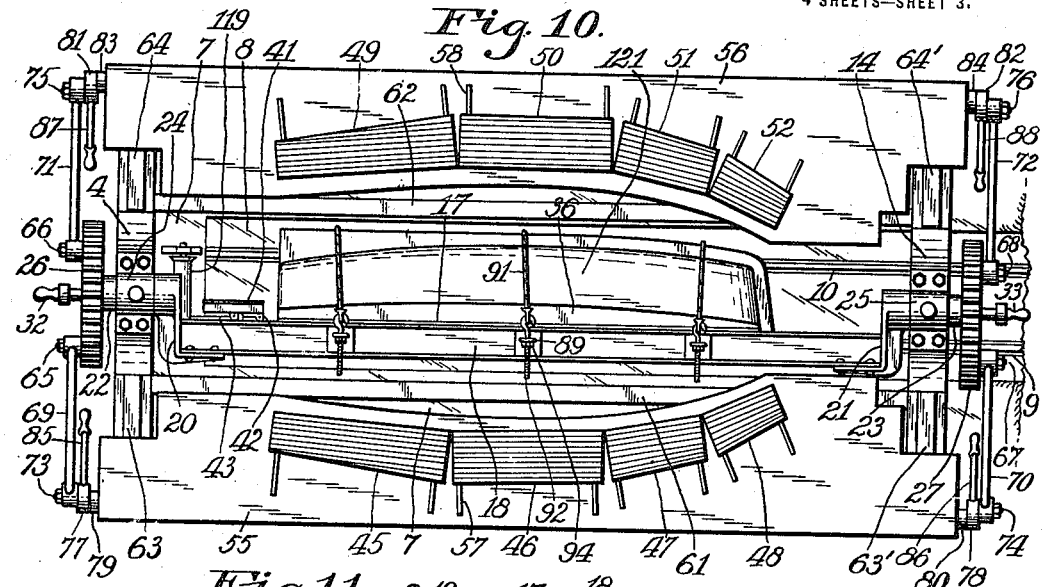
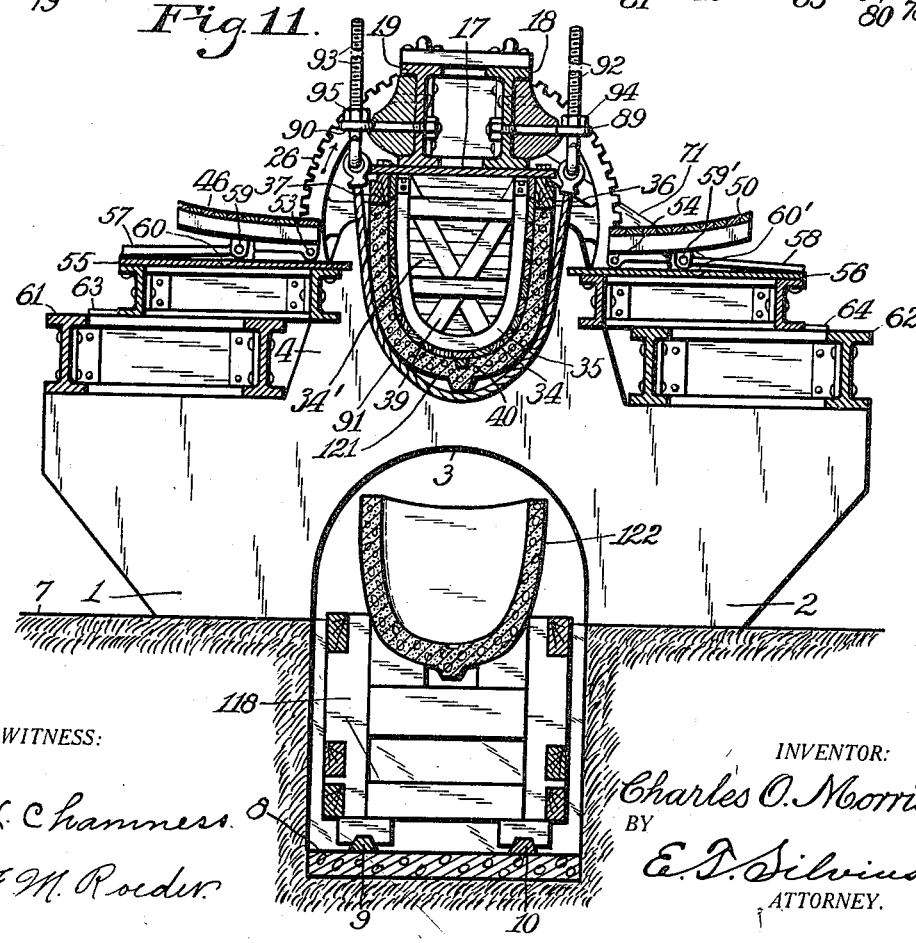
WITNESS:
INVENTOR:
Charles O. Morris,
BY
E. D. Silvius,
ATTORNEY.

C. O. MORRIS.
MEANS FOR AND METHOD OF BUILDING CONCRETE BOATS.
APPLICATION FILED NOV. 14, 1918.

1,311,612.

Patented July 29, 1919.
4 SHEETS—SHEET 4.

WITNESS:
O. L. Chamness
F. M. Roeder

INVENTOR:
Charles O. Morris,
BY
E. D. Silvius,
ATTORNEY.

UNITED STATES PATENT OFFICE.

CHARLES O. MORRIS, OF INDIANAPOLIS, INDIANA.

MEANS FOR AND METHOD OF BUILDING CONCRETE BOATS.

1,311,612.  Specification of Letters Patent.  Patented July 29, 1919.

Application filed November 14, 1918. Serial No. 262,506.

*To all whom it may concern:*

Be it known that I, CHARLES O. MORRIS, a citizen of the United States, residing at Indianapolis, in the county of Marion and State of Indiana, have invented a new and useful Means for and Method of Building Concrete Boats, of which the following is a specification, reference being had to the accompanying drawings and to the letters and figures of reference marked thereon.

This invention relates to the art of building or constructing open-top vessels and especially such as are known as boats, more particularly boat hulls, of plastic composition of the character that is adapted to be formed by means of form molds.

An object of the invention is to provide improved means whereby a boat or vessel may be expeditiously, efficiently and economically constructed of plastic material, with the usual reinforcement of the material if desired.

Another object is to provide means for building concrete boats rapidly and ready to be floated in water to there receive final completion and equipment.

A further object is to provide means whereby a concrete boat or boat hull may be advantageously and cheaply molded, troweled on its external surface, permitted to become seasoned externally and afterward launched in a convenient manner.

A still further object is to provide means whereby a boat or open-top vessel may be conveniently and economically molded in inverted position, and overturned to upright position when seasoned and readily launched within the shortest possible period of time after having been molded; which means shall be so constructed as to permit workmen to rapidly and conveniently trowel the external surface of the boat or vessel.

Another and particular object of the invention is to provide an improved method of building concrete boats so as to permit the builders to thoroughly inspect and perfect the external surface of the boat hull and to enable the workmen to carefully and properly place reinforcing in the plastic material, progressively or otherwise, to the end that concrete boats may be produced rapidly, cheaply and in a superior manner.

With the above-mentioned and other objects in view, the invention consists in means for supporting a form mold in inverted position and overturning the mold to upright position to permit the exterior of the article formed on the mold to be conveniently and efficiently inspected and perfected; and, the invention consists also further in an improved method of producing concrete boats, and in the structural parts and combinations and arrangements of parts as hereinafter particularly described and further pointed out in the appended claims.

Figures 13, 14:
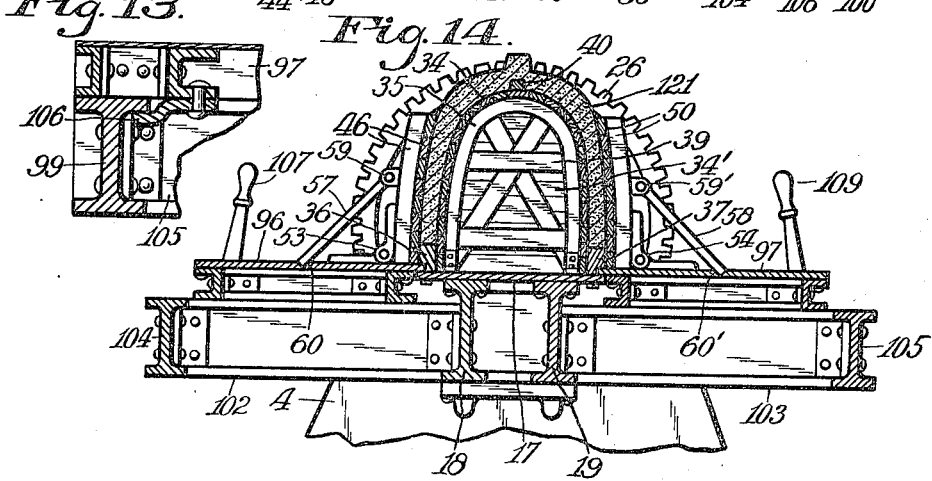
Figures 15, 16:
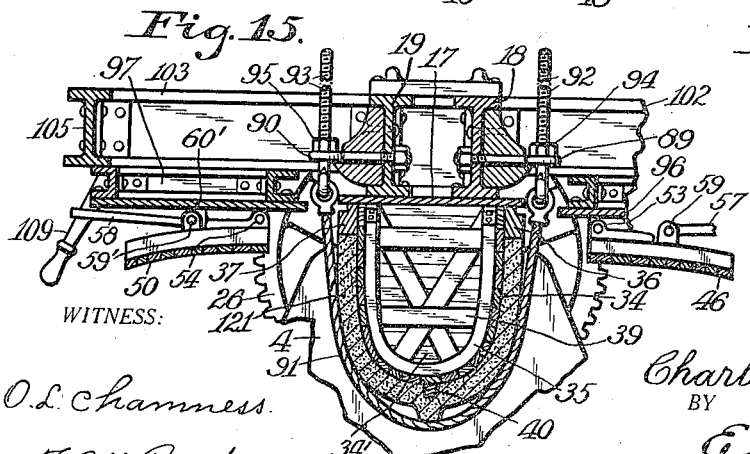

Referring to the drawings,—Figure 1 is a side elevation of the machine or apparatus, as preferably constructed, comprised in the invention when designed to be located on land adjacent to water, as is preferred; Fig. 2 is a top plan of the machine or apparatus; Fig. 3 is a fragmentary sectional elevation approximately on the line III—III in Fig. 2 with the addition of concrete formation; Fig. 4 is a fragmentary sectional view showing portions of one end of the machine or apparatus; Fig. 5 is an end elevation of the machine or apparatus and section of the ground or earth at the end of the machine; Fig. 6 is a transverse sectional elevation approximately on the line VI—VI in Fig. 1; Fig. 7 is a fragmentary detail showing controlling devices of parts of the machine or apparatus; Fig. 8 is a fragmentary sectional elevation on the line VIII—VIII in Fig. 1; Fig. 9 is a fragmentary sectional elevation approximately on the line IX—IX in Fig. 1 with the addition of concrete formation; Fig. 10 is a top plan of the machine or apparatus on which is a boat and the machine adjusted to permit launching of the boat, the latter being shown as when being overturned to upright position; Fig. 11 is a transverse sectional elevation of the machine in which a boat or hull is in position to be released from its mold, another boat or hull being shown as having been previously released to be lowered into the water, the view being taken approximately on the plane of the line IX—IX in Fig. 1; Fig. 12 is a top plan of the machine or apparatus slightly modified as to details; Fig. 13 is a fragmentary detail of the modified construction; Fig. 14 is a fragmentary transverse section approximately on the line XIV—XIV in Fig. 12; with the addition of a concrete boat therein; Fig. 15 is a fragmentary section of the modified construction inverted and showing the concrete boat secured in place on its mold to be released therefrom; and, Fig. 16 is a fragmentary detail showing parts of the modified construction.

Similar reference characters in the different figures of the drawings indicate corresponding elements or features of construction herein referred to.

The means or apparatus comprised in the invention may be located in any suitable place, preferably in proximity to a body of water and comprises a structure having facilities for supporting a mold in inverted position and turning the mold over to bring the boat molded thereon to upright position. An example of such structure, which suffices for illustrating and explaining the invention, comprises two end supporting members which preferably are strongly constructed of concrete, one end member comprising two legs or posts 1 and 2 connected to an arch portion 3 upon which is a central axle support portion 4, and brackets or bench portions 5 and 6 extending from opposite sides respectively of the portion 4. The legs preferably extend downward into the ground or earth 7 for firm support. In some cases the structure may be located in a body of water, so that the concrete boat may be lowered directly into the water, but when the structure is located on land as illustrated an inclined run-way 8 is provided that extends approximately from the end member downward into the body of water and has suitable track rails 9 and 10 for guiding the boat downward to the water. The opposite end member, as illustrated, has relatively longer legs 11 and 12 arranged on opposite sides respectively of the run-way and supported deep in the ground, the latter end member comprising also an arch portion 13 connected to the legs and having a central axle support portion 14 thereon, brackets or bench portions 15 and 16 being provided at opposite sides respectively of the axle support. Each end member preferably is of monolithic construction when composed of concrete. A central main rotary platform is provided which preferably comprises a top member or plate 17 and supporting beams 18 and 19, all secured together, the platform being provided with a suitable supporting axle preferably having its axis of rotation off-set so as to be above the platform, or approximately on the center of gravity of the platform and its mold equipment together with a concrete boat thereon. To this end, two hanger members 20 and 21 are firmly connected to the opposite ends respectively of the main platform and are provided with stub axles or trunnions 22 and 23 respectively that are rotatably mounted in journal boxes 24 and 25 secured upon the axle supports 4 and 14 respectively, so that the platform shall normally hang suspended from the journal boxes. For controlling the platform and overturning it the axle or trunnions have gear wheels 26 and 27 secured thereto respectively. The arch 3 supports an axle 28 and the arch 13 supports an axle 29, and pinions 30 and 31 are mounted to rotate on the axles respectively and in engagement with the gear wheels 26 and 27 respectively. An example of simple devices whereby the pinions may be rotated and controlled comprise cranks 32 and 33 connected to the pinions respectively, but it should be understood that various well known power means may be adapted for controlling the pinions.

A form mold 34 is provided which is shaped externally to the internal contour of the boat hull or vessel required and preferably is hollow and provided with internal frame members 35. The mold is arranged in inverted position upon the rotary platform and rigidly secured thereto; and also, top edge forms 36 and 37 are secured to the rotary platform at the outside of the form mold 34, the top of the top edge forms being shaped to the contour required of the tops of the hull sides. The form mold 34 is curved to proper or desired contour and is generally convex on its surface and preferably has a straight stern end portion 34', depending upon the shape of the boat desired, in which case a top edge mold form 38 is arranged at the outer side of the stern form. The inside of the mold form is provided with suitable braces 39. Preferably the form mold 34 has a longitudinal rib 40 thereon to serve as a guide to the workmen to determine the position in which to build up a keel of concrete on the bottom of the hull.

Suitable outside or external form molds are provided to be used in association with the internal form mold, and preferably the external molds are hingedly arranged in place so that they shall always be conveniently at hand and not be permitted to be lost or misplaced. A stern form mold 41 is arranged adjacent to the outer side of the mold 38 and has hinges 42 that are connected to the top member or plate. The form mold 41 is provided with suitable props 43 removably seated in sockets or abutment devices 44 provided on the top part 17 of the rotary platform, to hold the mold in upright position opposite to the stern portion 34'. For holding the plastic material to the sides of the internal form mold 34, suitable external side form molds are provided and preferably are composed of sections, so that one side form mold comprises sections 45, 46, 47 and 48; and, the companion side form mold comprises sections 49, 50, 51 and 52. The sections are arranged adjacent to the top edge form molds 36 and 37 respectively and are provided with hinges 53 and 54 respectively which are suitably supported, preferably on movable side platform sections 55 and 56 respectively and provided with props 57 and 58 connected by means of hinges 59 and 59' to the mold sections respectively and removably seated in sockets or abutment devices 60 and 60' on the platform sections respectively, so that the side form molds may be swung away from the concrete structure and also may be bodily moved away from the structure. The platform sections may be adjusted so that the thickness of the boat hull may be varied. The platform sections 55 and 56 preferably are supported upon stationary frames 61 and 62 respectively which are supported upon the brackets or benches of the end members of the machine or apparatus, the frame 61 having suitable guides 63 and 63' for guiding the section 55, the other frame 62 having guides 64 and 64' for guiding the section 56. The side platforms or sections preferably have overlapping engagement with the central or main part of the platform to constitute positioning guides for the rotary platform and may be moved away to afford clearance space in which to turn the molded concrete vessel over to inverted position. Preferably provision is made for automatically moving and controlling the side platform sections in synchronism with the rotary platform; and, for this purpose the gear wheel 26 is provided with crank pins 65 and 66 and the wheel 27 likewise provided with crank pins 67 and 68. Coupling rods 69 and 70 are connected with the pins 65 and 67 respectively for controlling the platform 55, and similar rods 71 and 72 connected to the crank pins 66 and 68 for controlling the platform 56. The platform 55 is provided with suitable wrist pins 73 and 74 to which the rods 69 and 70 are respectively connected, and the platform 56 is likewise provided with two wrist pins 75 and 76 to which the rods 71 and 72 are connected respectively. In order that the platforms or sections 55 and 56 may be adjusted or moved while the main platform is at rest the wrist pins 73 and 74 are adjustably connected to the platform 55, preferably being a portion of eccentrics 77 and 78 eccentrically connected with base members 79 and 80 mounted on the platform, and the pins 75 and 76 are portions of eccentrics 81 and 82 eccentrically supported on base members 83 and 84 respectively which are mounted on the platform 56. The eccentrics 77 and 78 are provided with controlling arms 85 and 86 respectively and the eccentrics 81 and 82 are provided with similar arms 87 and 88. The controlling devices for the eccentrics are intended to illustrate only a simple form of device which may be varied in practice as may be desired.

In order to hold the concrete vessel in its mold while being turned over to upright position to be launched, the rotary platform frame is provided with suitable connecting devices or lugs, preferably arms or lateral projections 89 and 90, and a suitable number of cables or yokes 91 are provided which have securing rods 92 and 93 adapted to be connected to the arms respectively, and are provided with adjusting nuts 94 and 95 to engage the arms respectively; the arrangement being such as to permit the concrete vessel to be securely clamped to its mold. The side platforms or sections 55 and 56 comprise practical extensions of the main platform and afford ample space for workmen to operate and on which to conveniently handle the plastic material.

In some cases, as when a relatively small machine or apparatus is required for small boats, platform sections 96 and 97, generally similar to the platforms or extensions 55 and 56, are provided and are mounted practically on the main platform so as to be overturned therewith, in which case the main or rotary platform is constructed so as to be of sufficient width to support the side sections or extensions; and so constructed the main platform has frame beams 98 and 99 at one end and similar beams 100 and 101 at the opposite end thereof and also intermediate beams 102 and 103, a side rail 104 being connected to the ends of one set of beams and a similar rail 105 to the ends of the opposite set of beams, all the beams being secured to the main beams 18 and 19 so as to constitute a unitary frame on which the platform sections or extensions 96 and 97 are slidingly mounted and guided by a suitable number of guide lugs 106 slidingly engaging the end beams, as shown more clearly in Fig. 13, so as to prevent the platform extensions falling away from the main frame when inverted; various forms of guiding devices, however, being available if desired. The platform sections or extensions 96 and 97 are equipped with the external side form molds, as above described, and in some cases may be stationarily secured to the main frame but preferably are adjustable so as to draw the side form molds away from the molded concrete vessel to afford ample space in which the workmen may operate when troweling the outer surface of the vessel. Any suitable appliances may be provided for moving and controlling the platform sections, and an example of such appliances are illustrated and comprise two levers 107 and 108 for one of the sections and similar levers 109 and 110 for the opposite one of the sections, the levers being arranged at the ends of the sections; and each lever is connected at one end to the adjacent main frame extension by means of a pivot stud 111 as shown in Fig. 16, a suitable number of links 112, 113, 114, 115 being connected to the levers respectively, each by means of a pivot 116, each link being connected to the adjacent platform portion by means of a pivot stud 117.

Suitable provision is made for protecting the concrete vessel when launching it, in case it is constructed on land, and preferably a cribbing or car 118 is provided which is mounted to run on the track rails 9 and 10, being preferably composed of metal so as to sink in the body of water and permit the boat hull to float therefrom; and in order to control the movement of the car and draw it back from the water a suitable winding drum 119 is mounted at the head of the runway 8 and has a cable 120 thereon which is connected to the car.

A concrete boat hull 121 is shown in the mold and a similar hull 122 is shown in position on the car 118 in Fig. 11. In some cases core blocks 123 are fastened to the external side form molds to form openings in the side walls of the vessel. In order to permit the molded hull or vessel to readily slip freely from the internal form mold 34 the surface of the latter may be suitably covered with a coat or layer of parting substance, as is common in molding operations; but it is preferred that the parting substance be a layer 124 composed of suitably treated sheet asbestos to permit the admission of air between the layer and the concrete which may be advantageous in preventing suction as the vessel slips away from its internal form mold.

In practical use the platform is properly adjusted, as will be understood, the external side form molds are adjusted to set at the required distance from the internal form mold, and the space between the internal and external molds is filled with the desired plastic material until the walls of the vessel are built up as high as the external side form molds, after which the plastic material is laid on the curved portion of the internal form mold and the bottom of the vessel completed thereon. When the plastic material is sufficiently seasoned to be self supporting the external form side molds are removed therefrom, after which the outer surface of the vessel or hull is troweled if desired and water-proofed. When the concrete is properly set and hardened so as to retain its shape with the aid of the reinforcement usually preferred to be embedded therein, the side platform sections or extensions are moved back, after which the yokes 91 are applied to clamp the concrete hull or vessel in place. The platform and the hull thereon may then be turned to relatively inverted position to bring the hull or vessel to its normal upright position, after which the hull or vessel may be lowered by any suitable means after having removed the retaining yokes, and afterward transferred to the body of water and finished as may be desired.

Having thus described the invention, what is claimed as new is—

1. Means, for building concrete boats, including a rotary platform, an internal form mold secured to the platform, external form molds, and means for adjustably supporting the external form molds in proximity to the sides of the internal form mold.

2. Means, for building concrete boats, including inner and outer form molds rotatably supported, the outer form molds being adjustably supported to be moved toward or away from the inner form mold, and means for adjusting the outer form molds.

3. Means, for building concrete boats, including a platform having a supporting shaft enabling the platform to be inverted, and a form mold secured to the platform and having a generally convex surface adapted to determine the internal shape of the boat hull.

4. Means, for building concrete boats, including a rotary platform having a plurality of connecting lug devices on its sides, an internal form mold secured to the platform, and a plurality of yokes extending about the form mold and detachably connected to the connecting lug devices, each yoke to two of the devices.

5. Means, for building concrete boats, including a rotary platform, an internal form mold secured to the platform, a plurality of cables to extend about the form mold and to the platform, and means for adjustably and detachably connecting the cables to the platform.

6. Means, for building concrete boats, including a platform, an internal form mold supported on the platform, and two external side form molds adjustably supported on the platform adjacent to opposite sides respectively of the internal form mold, each side form mold having a plurality of curved sections.

7. Means, for building concrete boats, including a rotary platform, an internal form mold supported on the rotary platform, and two curved sectional external side form molds on opposite sides respectively of the internal form mold and adjustably supported to be moved each toward or from the internal form mold.

8. Means, for building concrete boats, including a rotary central platform, an internal form mold and top edge molds secured to the central platform, the forms having curved contours, two side platforms movable to or from the top edge molds respectively, and curved external side form molds supported on the side platforms respectively.

9. Means, for building concrete boats, including a platform having an internal form mold and also sectional external side mold forms thereon, the sections of the side mold forms being adjustably supported collectively on opposite sides respectively of the internal form mold, the platform being rotatably supported.

10. Means, for building concrete boats, including a platform, an internal form mold secured to the platform, a top edge form mold secured to the platform against the internal form mold, the top of the edge form mold having a longitudinally curved contour, and an external side form mold movably connected to the platform against the top edge form mold.

11. Means, for building concrete boats, including a mechanically controlled rotary platform and adjustable side extension sections therefor, an internal form mold secured to the rotary platform, a plurality of external side form molds supported on the side extension sections, and power means for moving and controlling the side extension sections.

12. Means, for building concrete boats, including a rotary platform, an internal form mold secured to the platform, and external side mold forms adjustably mounted on the platform at opposite sides respectively of the internal form mold, each side mold form being supported to be pivotally swung away from the internal form mold.

13. Means, for building concrete boats, including a central platform, an internal form mold and top edge molds secured to the central platform, two side platforms movable to or from the edge molds respectively, and external side molds hingedly connected to the side platforms respectively and provided with props to coöperate with the side platforms.

14. Means, for building concrete boats, including a platform, an internal form mold supported on the platform, and two external side form molds on opposite sides respectively of the internal form mold, each side form mold comprising a plurality of sections hingedly connected to the platform to be separately swung away from the internal form mold.

15. Means, for building concrete boats, including a main platform and platform extensions at opposite sides of the main platform, each platform extension being adjustable relatively to the main platform and having each a side form mold thereon, and an internal form mold on the main platform and extending upward beyond the plane of the tops of the side form molds.

16. Means, for building concrete boats, including a frame, a main platform having trunnions supported by the frame, an internal form mold secured to the platform, external side form molds associated with the internal form mold, a gear wheel secured to one of the trunnions, a pinion rotatably mounted on the frame in connection with the gear wheel, and means for rotating and controlling the pinion.

17. Means, for building concrete boats, including a rotary platform provided with controlling gearing, an internal form mold secured in inverted position upon the platform and provided with external form molds, and means for supporting the external form molds adjacent to the internal form mold and permitting the external form molds to be moved away from the internal form mold.

18. In means for building concrete boats, an elevated frame structure provided with structural means whereon to form a vessel of concrete in inverted position and to turn the vessel over to upright position, the structural means being provided with controlling means and also yokes to temporarily secure the vessel thereto.

19. In means for building concrete boats, the combination of upright arched end members, a platform rotatably mounted on the end members and provided with removable yokes to hold the boat, a form mold secured to the platform on which to mold the boat to be held by the yokes, and an inclined runway extending below the platform to receive the boat.

20. In means for building concrete boats, the combination with two end supports, of a platform rotatably mounted on the supports, an internal form mold secured to the platform, two frames on opposite sides respectively of the platform and supported on the end supports, two platform sections movably mounted on the frames respectively, and external side form molds mounted on the frames respectively.

21. In means for building concrete boats, the combination with two end supports, of a platform rotatably mounted on the supports and provided with movable platform extensions adjacent to opposite sides thereof, an internal form mold secured to the platform, a top edge form mold secured to the platform adjacent to the outer side of the internal form mold, external side form molds mounted on the platform extensions respectively, and power means connected with the platform extensions for moving the extensions.

22. In means for building concrete boats, the combination with two end supports, of a platform having journals rotatably mounted on the end supports, an internal form mold secured to the platform, two wheels secured to the journals respectively, each wheel having two crank pins, two platform sections movably mounted on the end supports adjacent to opposite sides respectively of the platform, external side form molds mounted on the platform sections respectively, and coupling rods connected to the platform sections and the crank pins.

23. In means for building concrete boats, the combination with two end supports, of a platform having journals rotatably mounted on the end supports, each journal being provided with two cranks, two platform sections movably mounted on the end supports adjacent to opposite sides respectively of the platform, external side form molds mounted on the platform sections respectively, coupling rods connected to the cranks respectively, two eccentric devices connecting two of the rods with one of the platform sections, and two eccentric devices connecting the remaining two rods to the remaining one of the platform sections.

24. In means for building concrete boats, the combination with two end supports, of a platform having journals rotatably mounted on the end supports, two platform sections movably mounted on the end supports adjacent to opposite sides respectively of the platform, power means for rotating the platform, longitudinally extensible or contractible connections between the power means and the platform sections whereby to move the sections independently and also synchronously with the rotation of the platform, an internal form mold secured to the platform, and external side form molds mounted on the platform sections.

25. Means for building concrete boats, comprising two end supports, a main platform extending between the two end supports and having its opposite end portions rotatably mounted thereon, two gear wheels having rigid connection with the platform adjacent to its opposite ends respectively, each gear wheel having two crank pins, an internal form mold secured to the platform and having a coating layer on its outer surface, two platform sections movably supported to constitute extensions of the main platform, each platform section having a plurality of external side form sections hinged thereon and provided with props to coöperate with the platform sections, means for rotating and controlling the two gear wheels, and connecting means actuated and controlled by the crank pins having operative connection with the platform sections to move the sections automatically on rotation of the gear wheels.

26. The method of building concrete vessels which comprises the molding of the vessel in inverted position on suitable forms having rotary support, overturning the forms and the vessel thereon to upright position, and lowering the vessel away from the forms.

27. The method of building concrete vessels which comprises the molding of the vessel in inverted position on suitable forms having rotary support, removing parts of the forms from the outer side of the vessel, troweling the outer side of the vessel, securing the molded vessel to the remaining parts of the forms, overturning the vessel with the form parts, and releasing and lowering the vessel from the rotary forms to be removed thence in upright position.

In testimony whereof I affix my signature in presence of two witnesses.

CHARLES O. MORRIS.

Witnesses:
L. C. DARDEN,
A. H. ERHNGE.

Copies of this patent may be obtained for five cents each, by addressing the "Commissioner of Patents, Washington, D. C."